(12) United States Patent
Hetzler et al.

(10) Patent No.: US 11,743,241 B2
(45) Date of Patent: Aug. 29, 2023

(54) SECURE DATA MOVEMENT

(71) Applicant: International Business Machines Corporation, Armonk, NY (US)

(72) Inventors: Steven Robert Hetzler, Los Altos, CA (US); Guerney D. H. Hunt, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 17/138,539

(22) Filed: Dec. 30, 2020

(65) Prior Publication Data

US 2022/0210139 A1 Jun. 30, 2022

(51) Int. Cl.
*H04L 29/06* (2006.01)
*H04L 9/08* (2006.01)
*H04L 9/14* (2006.01)
*H04L 9/40* (2022.01)

(52) U.S. Cl.
CPC ........ *H04L 63/0471* (2013.01); *H04L 9/0819* (2013.01); *H04L 9/0861* (2013.01); *H04L 9/14* (2013.01); *H04L 63/0478* (2013.01)

(58) Field of Classification Search
CPC . H04L 63/0471; H04L 9/0819; H04L 9/0861; H04L 9/14; H04L 63/0478
See application file for complete search history.

(56) References Cited

U.S. PATENT DOCUMENTS

| | | | |
|---|---|---|---|
| 7,181,017 B1 | 2/2007 | Nagel et al. | |
| 7,548,987 B2 | 6/2009 | Jabri et al. | |
| 8,904,181 B1 | 12/2014 | Felsher et al. | |
| 8,966,287 B2 | 2/2015 | Bogorad | |
| 9,104,618 B2 | 8/2015 | Sela et al. | |
| 9,342,466 B2 | 5/2016 | Shapiro | |
| 9,419,951 B1* | 8/2016 | Felsher | H04L 9/0841 |

(Continued)

FOREIGN PATENT DOCUMENTS

| CN | 102098318 A | 6/2011 |
|---|---|---|
| CN | 106067871 A | 11/2016 |

(Continued)

OTHER PUBLICATIONS

Hetzler et al., U.S. Appl. No. 17/138,552, filed Dec. 30, 2020.

(Continued)

*Primary Examiner* — Darshan I Dhruv
(74) *Attorney, Agent, or Firm* — Zilka-Kotab, P.C.

(57) ABSTRACT

A computer-implemented method includes receiving, by a transcoder, second encrypted data. The second encrypted data is data that has been encrypted in a first key to create first encrypted data that is then encrypted in a second key to create the second encrypted data. The method includes receiving the second key and decrypting the second encrypted data using the second key to obtain the first encrypted data. The method includes encrypting the first encrypted data using a third key to create third encrypted data, and sending the third encrypted data to a destination node. A computer-implemented method includes receiving, by a transcoder, a second encrypted key. The second encrypted key is a key that has been encrypted in a first key to create a first encrypted key that is then encrypted in a second key to create the second encrypted key.

22 Claims, 8 Drawing Sheets

(56) References Cited

U.S. PATENT DOCUMENTS

| | | | |
|---|---|---|---|
| 9,847,979 B2* | 12/2017 | Peterka | H04N 21/4408 |
| 9,946,895 B1* | 4/2018 | Kruse | G06F 21/6227 |
| 10,033,702 B2 | 7/2018 | Ford et al. | |
| 10,187,200 B1* | 1/2019 | Firestone | H04L 63/0435 |
| 10,528,485 B2 | 1/2020 | Chhabra et al. | |
| 10,735,137 B2 | 8/2020 | Yanovsky et al. | |
| 11,005,828 B1* | 5/2021 | Kapp | G06F 21/64 |
| 11,050,723 B1* | 6/2021 | Mahdavi | H04L 63/0478 |
| 2004/0109569 A1* | 6/2004 | Ellison | G11B 20/00362 |
| 2008/0049942 A1* | 2/2008 | Sprunk | H04L 9/006 |
| | | | 380/283 |
| 2010/0042831 A1 | 2/2010 | Bahr et al. | |
| 2013/0039486 A1* | 2/2013 | Itoh | H04L 9/3066 |
| | | | 380/28 |
| 2013/0136264 A1* | 5/2013 | Kim | H04L 65/612 |
| | | | 380/278 |
| 2014/0149734 A1* | 5/2014 | D'Souza | H04L 9/0825 |
| | | | 713/155 |
| 2016/0211976 A1* | 7/2016 | Paris | H04L 63/06 |
| 2018/0159684 A1* | 6/2018 | Roth | H04L 9/088 |
| 2018/0331824 A1* | 11/2018 | Racz | H04L 9/30 |
| 2018/0359222 A1* | 12/2018 | Hathaway | H04L 63/045 |
| 2019/0014126 A1* | 1/2019 | Sherkin | H04L 12/1886 |
| 2019/0044973 A1* | 2/2019 | Deutsch | H04L 63/1466 |
| 2019/0080099 A1* | 3/2019 | Roth | G06F 21/602 |
| 2019/0207769 A1* | 7/2019 | Donohoe | G06F 21/602 |
| 2019/0297063 A1* | 9/2019 | De Gaspari | H04L 9/0847 |
| 2019/0306124 A1* | 10/2019 | Bild | H04L 9/0833 |
| 2020/0134207 A1 | 4/2020 | Doshi et al. | |
| 2020/0266997 A1* | 8/2020 | Monica | H04L 9/14 |
| 2021/0067495 A1* | 3/2021 | Yuting | H04L 9/3247 |
| 2021/0167955 A1* | 6/2021 | Rameez | H04L 9/0894 |
| 2022/0052835 A1* | 2/2022 | Eldefrawy | H04L 9/0825 |

FOREIGN PATENT DOCUMENTS

| | | | | |
|---|---|---|---|---|
| CN | 110581763 A | | 12/2019 | |
| EP | 1220079 A2 | | 7/2002 | |
| WO | WO-2018129003 A1 * | | 7/2018 | G06F 21/602 |
| WO | WO-2019083379 A1 * | | 5/2019 | G06F 21/602 |

OTHER PUBLICATIONS

Furtak, J., "Cryptographic Keys Generating and Renewing System for IoT Network Nodes—A Concept," Sensors, vol. 20, 2020, pp. 1-31.

Olakanmi et al., "An efficient point-to-point security solution for multihop routing in wireless sensor networks," Wiley, Special Issue Article, 2019, pp. 1-14.

Dang et al., "The Meeting of Acquaintances: A Cost-Efficient Authentication Scheme for Light-Weight Objects with Transient Trust Level and Plurality Approach," Hindawi, Security and Communication Networks, Wol. 2019, Apr. 2019, pp. 1-18.

Chan et al., "PIKE: Peer Intermediaries for Key Establishment in Sensor Networks," Proceedings IEEE 24th Annual Joint Conference of the IEEE Computer and Communications Societies, 2005, 13 pages, retrieved from https://www.semanticscholarorg/paper/PIKE%3A-peer-intermediaries-for-key-establishment-in-Chan-Perrig/49c3428dc5ce3e321e21bc5840299af9d6a30796.

Wikipedia, "Transcoding," Wikipedia, 2020, 4 pages, retrieved from https://en.wikipedia.org/wiki/Transcoding.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Wu et al., "Comprehensive VM Protection against Untrusted Hypervisor through Retrofitted AMD Memory Encryption," EEE International Symposium on High Performance Computer Architecture, 2018, pp. 441-453.

International Search Report and Written Opinion from PCT Application No. PCT/IB2021/061771, dated Mar. 29, 2022.

* cited by examiner

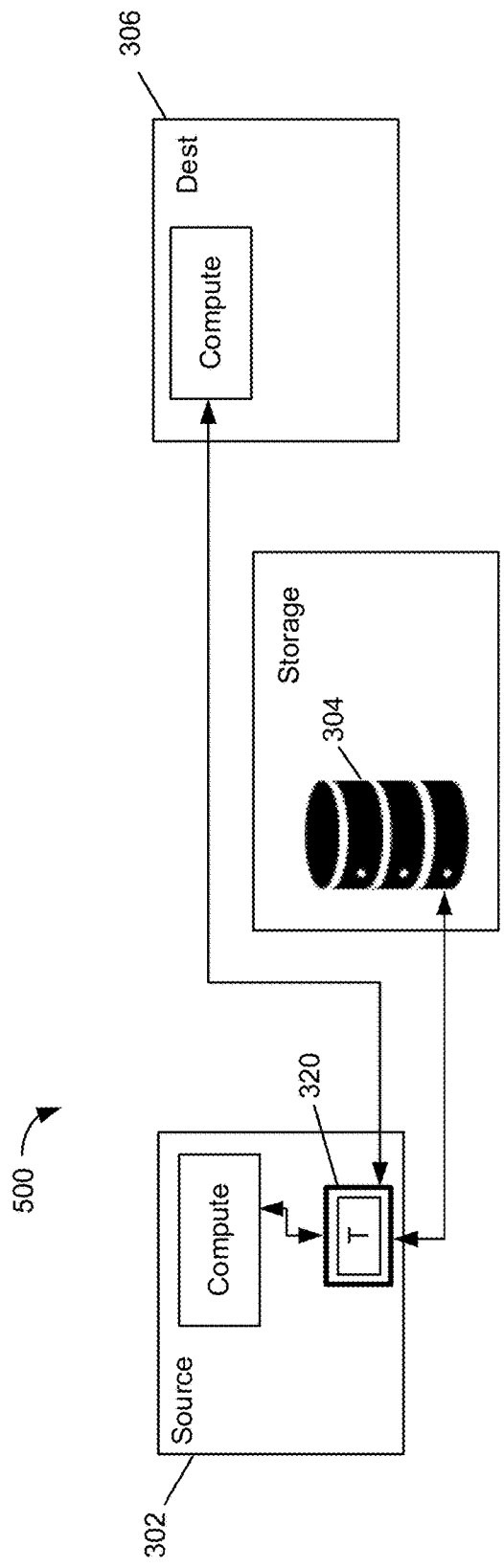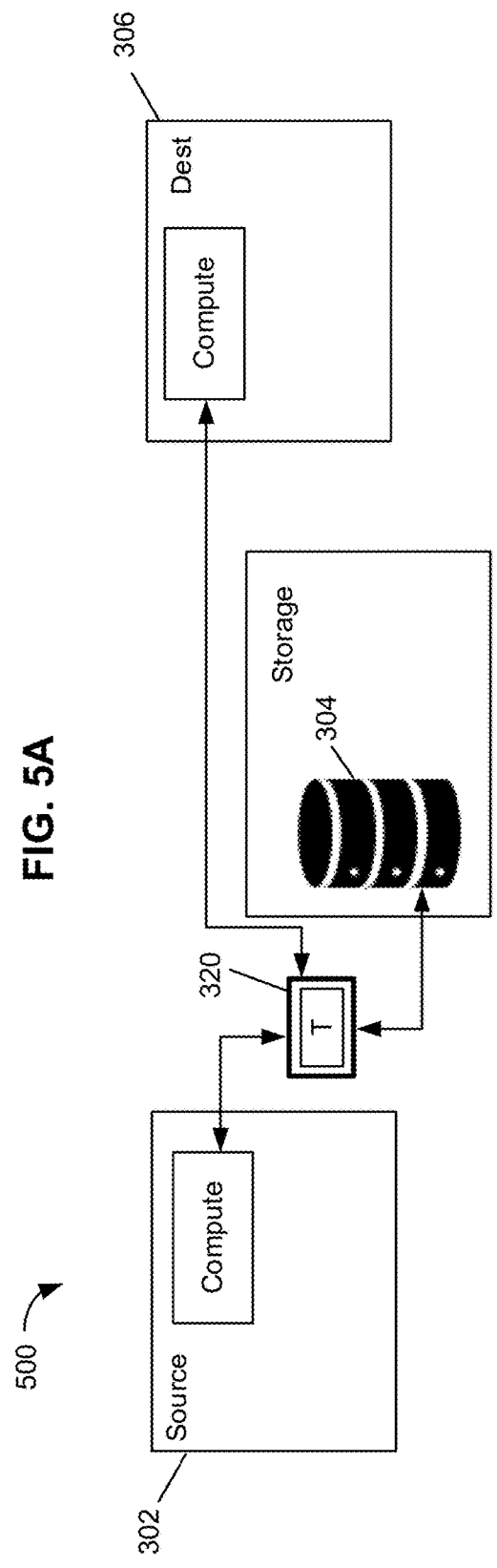

SECURE DATA MOVEMENT

BACKGROUND

The present invention relates to data movement using storage systems, and more particularly, this invention relates to secure transcoders for data movement in cloud storage systems and networks.

It is desirable to securely share data between various computer nodes. Secure data transfer is especially beneficial for providing compute functions near stored data. For example, each node may have a specific compute function (e.g., a database, an inference engine, etc.). Access controls are conventionally used in prior art approaches to limit data sharing. Access controls are not foolproof and may lead to data leakage. For example, privileges may be escalated, the controls may be misconfigured, etc.

In other prior art approaches, a source node encrypts the stored data. In another approach, the source node may decrypt data and send the data over a secure link for sharing. In yet another approach, the source node will decrypt the data and the source node may share the source node's decryption key with a destination node. In these applications, there are many opportunities for data leakage. For some applications, homomorphic encryption may be used to provide secure access to data, but the homomorphic encryption is limited to situations where the destination node is allowed to perform computations on data without having access to the plaintext of the data. The utility of homomorphic encryption is limited by its slow performance.

These various prior art approaches tend to require a high degree of trust in the destination node. Furthermore, these conventional approaches lack flexibility for function replacement. There remains a need in the art for a method of securely sharing data and allowing operations (e.g., such as compute near the storage) while providing a high degree of security for shared data, including the ability to terminate sharing, especially if the destination node misbehaves.

BRIEF SUMMARY

A computer-implemented method, according to one aspect, includes receiving, by a transcoder, second encrypted data. The second encrypted data is data that has been encrypted in a first key to create first encrypted data that is then encrypted in a second key to create the second encrypted data. The method includes receiving, by the transcoder, the second key and decrypting, by the transcoder, the second encrypted data using the second key to obtain the first encrypted data. The method also includes encrypting, by the transcoder, the first encrypted data using a third key to create third encrypted data, and sending, by the transcoder, the third encrypted data to a destination node. The computer implemented method provides the benefit of enabling the destination node to have access to data stored by the source node and decrypt the data for as long as the transcoder allows the destination node to do so.

The computer-implemented method, according to an optional aspect, may include sending, by the transcoder, the third key to the destination node. The destination node decrypts the third encrypted data using the third key to obtain the first encrypted data. The destination node decrypts the first encrypted data using the first key to obtain the data. This optional aspect advantageously gives the destination node access to doubly encrypted data which the destination node may decrypt and prevents data leakage where the transcoder never has access to the first key.

The computer-implemented method, according to an optional aspect, may include replacing, by the transcoder, the third key with a dummy key for ending data sharing between the source node and the destination node. This optional aspect beneficially restricts a destination node's access to the stored data even if the destination node maintains its own copy of the third key.

A system, according to another aspect, includes a processor and logic integrated with the processor, executable by the processor, or integrated with and executable by the processor. The logic is configured to perform the foregoing method.

A computer program product, according to yet another aspect, includes one or more computer readable storage media and program instructions collectively stored on the one or more computer readable storage media. The program instructions include program instructions to perform the foregoing method.

A computer-implemented method, according to one aspect, includes receiving, by a transcoder, a second encrypted key. The second encrypted key is a key that has been encrypted in a first key to create a first encrypted key that is then encrypted in a second key to create the second encrypted key. The method includes receiving, by the transcoder, the second key and decrypting, by the transcoder, the second encrypted key using the second key to obtain the first encrypted key. The method also includes encrypting, by the transcoder, the first encrypted key using a third key to create a third encrypted key, and sending, by the transcoder, the third encrypted key to the destination node. This aspect improves the efficiency of the transcoding where transcoding keys may be more efficient than transcoding relatively longer data blocks.

The computer-implemented method, according to an optional aspect, may include sending, by the transcoder, the third key to a destination node. The destination node decrypts the third encrypted key using the third key to obtain the first encrypted key. The destination node decrypts the first encrypted key using the first key to obtain the key. This optional aspect advantageously gives the destination node access to doubly encrypted data which the destination node may decrypt and prevents data leakage where the transcoder never has access to the first key.

The computer-implemented method, according to an optional aspect, may include the destination node using the key to decrypt data from the source node. This optional aspect may beneficially bypass double encryption processes for relatively longer data blocks while providing the security of double encryption.

A computer program product, according to yet another aspect, includes one or more computer readable storage media and program instructions collectively stored on the one or more computer readable storage media. The program instructions include program instructions to perform the foregoing method.

Other aspects and approaches of the present invention will become apparent from the following detailed description, which, when taken in conjunction with the drawings, illustrate by way of example the principles of the invention.

BRIEF DESCRIPTION OF THE DRAWINGS

FIGS. 5A-5D are diagrams of high level architectures, in accordance with one aspect of the present invention.

DETAILED DESCRIPTION

Figure 1:
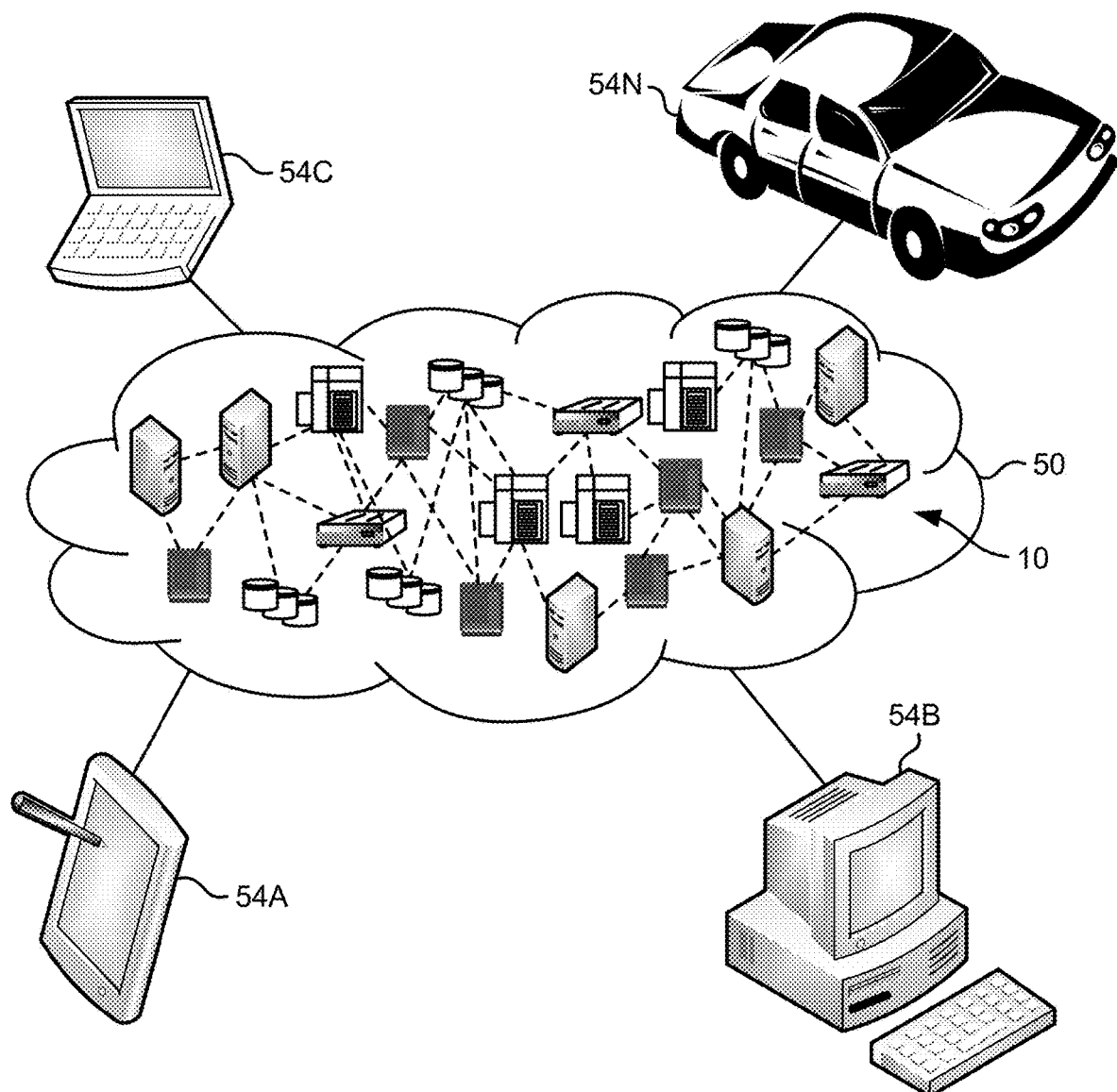
FIG. 1 depicts a cloud computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of sharing access to stored data between a source node and a destination node, using a transcoder to provide the destination node with access to the data without access to the source secret key(s) for decrypting the stored data.

In one general aspect, a computer-implemented method includes receiving, by a transcoder, second encrypted data. The second encrypted data is data that has been encrypted in a first key to create first encrypted data that is then encrypted in a second key to create the second encrypted data. The method includes receiving, by the transcoder, the second key and decrypting, by the transcoder, the second encrypted data using the second key to obtain the first encrypted data. The method also includes encrypting, by the transcoder, the first encrypted data using a third key to create third encrypted data, and sending, by the transcoder, the third encrypted data to a destination node.

In another general aspect, a system includes a processor and logic integrated with the processor, executable by the processor, or integrated with and executable by the processor. The logic is configured to perform the foregoing method.

In another general aspect, a computer program product includes one or more computer readable storage media and program instructions collectively stored on the one or more computer readable storage media. The program instructions include program instructions to perform the foregoing method.

In one general aspect, a computer-implemented method includes receiving, by a transcoder, a second encrypted key. The second encrypted key is a key that has been encrypted in a first key to create a first encrypted key that is then encrypted in a second key to create the second encrypted key. The method includes receiving, by the transcoder, the second key and decrypting, by the transcoder, the second encrypted key using the second key to obtain the first encrypted key. The method also includes encrypting, by the transcoder, the first encrypted key using a third key to create a third encrypted key, and sending, by the transcoder, the third encrypted key to the destination node.

In another general aspect, a computer program product includes one or more computer readable storage media, and program instructions collectively stored on the one or more computer readable storage media. The program instructions include program instructions to perform the foregoing method.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
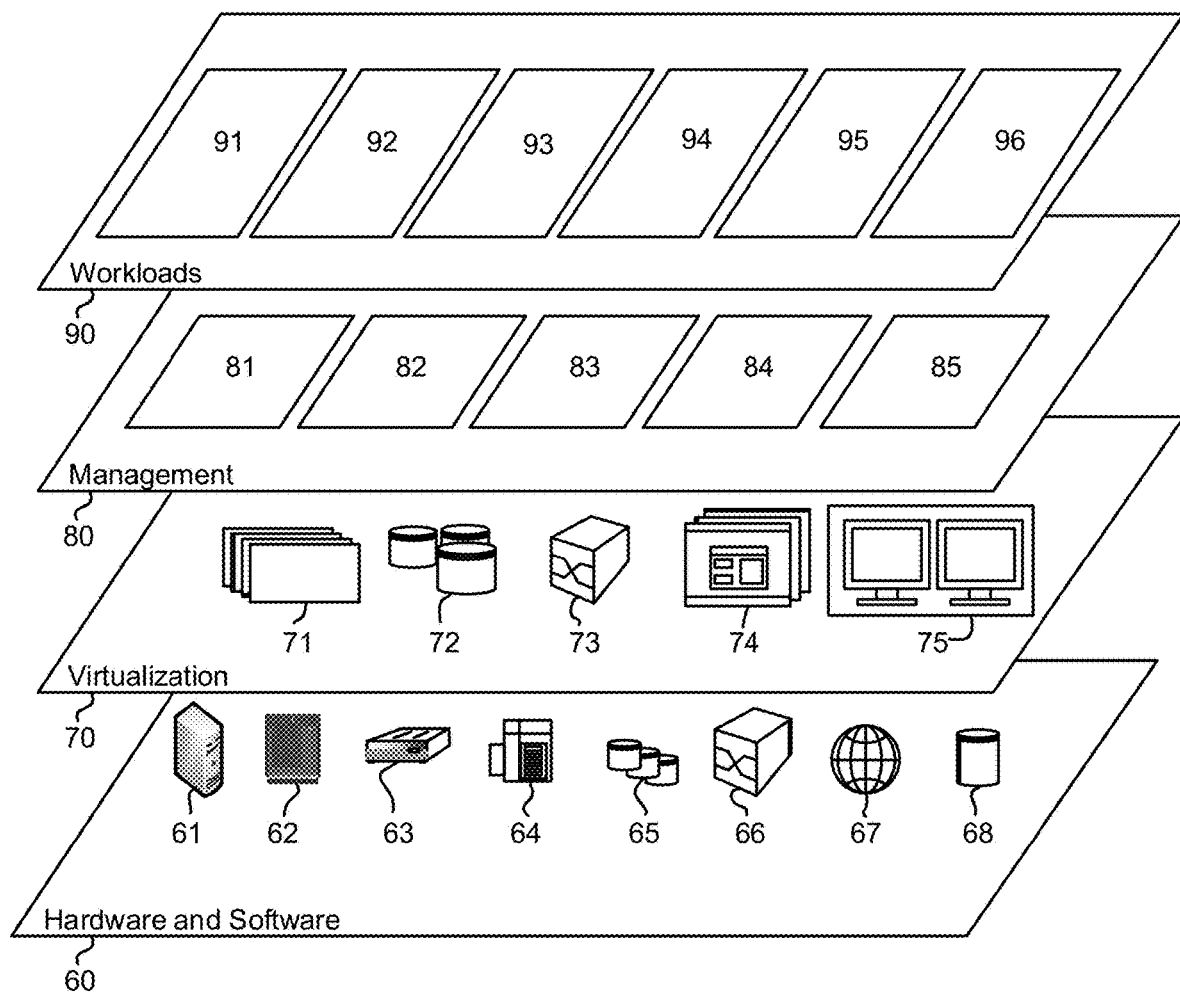
FIG. 2 depicts abstraction model layers, in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure data movement 96.

Various aspects of the present invention include sharing access to stored data between a source node and a destination node, using a secure transcoder to provide the destination node with access to the data without access to the source secret keys for decrypting the stored data. In preferred aspects, the stored data is encrypted by the source node with a first source key and the encrypted data (e.g., first encrypted data) is further encrypted by the source node with a second source key to create doubly encrypted data (e.g., second encrypted data). The first source key is shared with the destination node and the second source key is shared with the secure transcoder. The transcoder provides a third key and shares the third key with the destination node. The transcoder decrypts the doubly encrypted data using the second key and reencrypts the now singly encrypted data in the third key for creating doubly encrypted data using the third key (e.g., third encrypted data). The transcoder shares the third key with the destination node. The destination node accesses the doubly encrypted data (e.g., encrypted in the first key and further encrypted in the third key) via the transcoder. The doubly encrypted data is stored in a data store for persistent data.

Advantageously, at least some aspects of the present invention enable the destination node to access and decrypt data for as long as the transcoder allows the destination node to do so (e.g., according to a sharing policy established between the source node and the transcoder). Furthermore, the transcoder never has access to the plaintext data and the destination node is prevented from having future access to the stored data once the sharing policy is changed.

In other approaches, the source node encrypts each chunk of data with a different chunk key (e.g., each chunk of data is encrypted with a unique chunk key) and uses at least some aspects of the present disclosure to encrypt each data chunk and transcode each data chunk. This key-per-chunk approach significantly reduces the encryption load for the transcoder.

At least some of the aspects described herein are advantageously usable with symmetric encryption techniques resulting in relatively higher performance compared to relatively slower, public key encryption methods of transferring data between nodes in a system.

Figure 3:
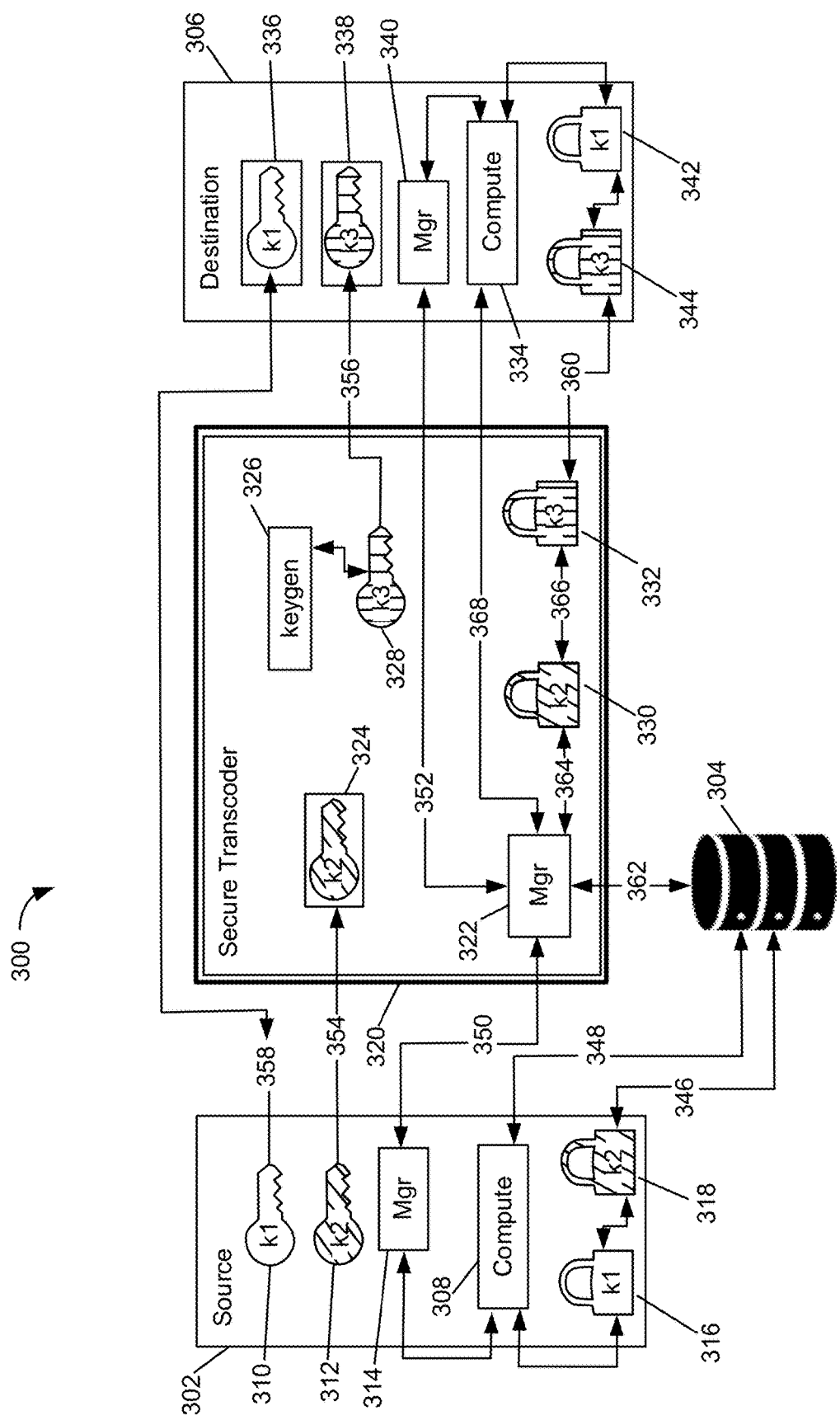
FIG. 3 is a diagram of a high level architecture, in accordance with one aspect of the present invention.

FIG. 3 depicts a high-level architecture, in accordance with various configurations. The architecture 300 may be implemented in accordance with the present invention in any of the environments depicted in FIGS. 1-2 and 4-7, among others, in various configurations. Of course, more, or less elements than those specifically described in FIG. 3 may be included in architecture 300, as would be understood by one of skill in the art upon reading the present descriptions.

Architecture 300 includes a high level architecture comprising a source node 302, storage 304, and a destination node 306. The source node 302 includes a source node compute resource 308, a first key k1 310, and a second key k2 312. The source node 302 includes a source node manager function 314, a source node k1 encrypt/decrypt function 316, and a source node k2 encrypt/decrypt function 318. Any encrypt/decrypt function described herein may be configured to encrypt and/or decrypt data using suitable key(s) and any known encryption technique(s), as would be understood by one having ordinary skill in the art upon reading the present disclosure. The source node 302 may include a plurality of first keys, a plurality of second keys, a plurality of sets of first keys, a plurality of set of second keys, etc.

The storage 304 may be a storage system, a solid state drive (SSD), a hard disk, a tape drive, a storage class memory, DRAM, persistent storage, or any type of storage known in the art or any combination thereof.

Architecture 300 includes a secure transcoder 320. The secure transcoder 320 includes a secure transcoder manager function 322 and secure key storage 324 for second key k2 312. The secure transcoder 320 may include a key generator 326, in at least some approaches. The secure transcoder 320 includes a third key k3 328. The secure transcoder 320 includes a secure transcoder k2 encrypt/decrypt function 330 and a secure transcoder k3 encrypt/decrypt function 332.

In various approaches, the key generator 326 generates the third key k3 328. The third key k3 328 may be generated by the source node 302 in some approaches. In other approaches, the third key k3 328 may be generated by the destination node 306. In preferred aspects, the third key k3 328 is generated by the key generator 326 or the source node 302 to avoid exposure to a weak key, key reuse, etc. In yet other approaches, any key as described herein may be generated and/or managed by a key generator and/or key manager known in the art (not shown), as would become apparent to one having ordinary skill in the art upon reading the present disclosure.

The secure transcoder 320 may be designed to perform sharing operations which are preferably each defined by separate policies. The transcoder may have a plurality of key storages and/or a plurality of secure transcoder encrypt/decrypt functions. These additional policies (and associated components) provide additional security for each share policy (e.g., each share policy may have a separate, unique third key, even though the share policies may access the same data).

The secure transcoder 320 may be implemented in hardware, software, etc., or any combination thereof. To achieve the desired security, the secure transcoder 320 protects the second key k2 312 against access outside of the secure transcoder 320 to prevent weakened or eliminated security due to data leakage.

The destination node 306 includes a destination node compute resource 334, key storage 336 for the first key k1 310, and key storage 338 for the third key k3 328. The destination node 306 includes a destination node manager function 340. The destination node 306 includes a destination node k1 encrypt/decrypt function 342 and a destination node k3 encrypt/decrypt function 344.

An exemplary implementation according to various aspects of architecture 300 is described with reference to the arrows and/or connecting lines of FIG. 3. Source node 302 stores data in the storage 304. Data as used throughout the present disclosure may include application data, metadata, keys, any other type of information, or any combination thereof, as would become apparent to one having ordinary skill in the art upon reading the present disclosure. As used throughout the disclosure, the encryption may be illustrated by the encryption notation "encrypt(key,data)" and the decryption may be illustrated by the decryption notation "decrypt(key,data)." The source node 302 storing a unit of data, denoted by "P," preferably encrypts the data, P, using the source node k1 encrypt/decrypt function 316 using the first key k1 310 as C1=encrypt(k1,P). The source node k2 encrypt/decrypt function 318 further encrypts the result (C1) using the second key k2 312 as C2=encrypt(k2,C1). Encrypted data C2 is sent in operation 346 to the storage 304. The stored data is encrypted in the combination of the first key k1 310 and the second key k2 312. In some approaches, data which does not require encryption for sharing may be sent in operation 348 directly to the storage 304. In various approaches, the storage 304 may include an encrypt/decrypt function thereon (not shown) for performing further encryption for storing the data in a manner which would become apparent to one having ordinary skill in the art upon reading the present disclosure.

Preferably, prior to sharing the data, the source node 302, the storage 304, the destination node 306, and the secure transcoder 320 authenticate each other to verify each other's identities. In various approaches, the identities of each component in architecture 300 may be authenticated according to protocols known in the art. In some approaches, the authentication may be part of setting up secure communication connections between the parties. In preferred aspects, all the communication links are secure (e.g., encrypted). For example, the source node 302 may set up shared access for data with the destination node 306 using a sharing policy. The sharing policy may comprise policy information such as the set of data to be shared, the duration of the sharing, the amount of data to be shared, other access privileges, etc., or any combination thereof. Policy information may be sent in operation 350 between the source node manager function 314 and the secure transcoder manager function 322 (e.g., from the source node manager function 314 to the secure transcoder manager function 322). The secure transcoder manager function 322 may verify the policy information is correct and that the policy is supported by the secure transcoder 320. Such verification may include communicating at operation 352 with the destination node manager function 340 to confirm support of the policy by the destination node 306. In response to the identities of each component being verified and the policy information being verified, the source node 302 may send the second key k2 312 in operation 354 to the secure transcoder 320. The secure transcoder 320 stores a copy of the second key k2 312 in the secure key storage 324 for second key k2 312.

In preferred aspects, neither the secure transcoder 320 nor the destination node 306 have access to both the first key k1 310 and the second key k2 312. Without such access, the secure transcoder 320 and the destination node 306 are unable to decrypt the data stored in storage 304 stored by the source node 302. In one preferred aspect, the secure key storage 324 for second key k2 312 is volatile such that, in the event of a power loss, the secure transcoder 320 has to reauthenticate the affected parties (and vice versa) in order to reestablish the sharing. In the event of a power loss, the secure transcoder 320 also reauthenticates the key storage 338 for third key k3 328, and vice versa, in order to reestablish the sharing. The duration of the secure transcoder 320 storing the second key k2 312 in the secure key storage 324 for second key k2 312 is determined by the sharing policy, as described above. In response to the sharing being terminated as indicated by the sharing policy, the secure transcoder 320 shreds (e.g., deletes or otherwise destroys) the stored copy of the second key k2 312, in any manner as would become apparent to one having ordinary skill in the art upon reading the present disclosure. Shredding of the second key k2 312 is beneficial for secure key storage 324 for second key k2 312 to restrict access of the stored key information to the secure transcoder k2 encrypt/decrypt function 330. This shredding prevents leaking of the second key k2 312.

As part of setting up sharing of data following the policy verification, the secure transcoder 320 may generate third key k3 328 using the key generator 326. The third key k3 328 is sent in operation 356 the destination node 306. The destination node 306 stores a copy of the third key k3 328 in the key storage 338 for third key k3 328. Further, as part of setting up sharing of data following the policy verification, the source node 302 sends the first key k1 310 to the destination node 306 in operation 358. The destination node 306 stores a copy of the first key k1 310 in the key storage 336 for first key k1 310. In preferred aspects, both the key storage 336 for first key k1 310 and key storage 338 for third key storage 312 are volatile. In one preferred approach, once the sharing ends, the secure transcoder 320 deletes the third key k3 328 and stops accepting requests for shared data from the destination node 306. In other approaches, the secure transcoder 320 replaces the third key k3 328 with a dummy key, in any manner that would become apparent to one having ordinary skill in the art upon reading the present disclosure, and such that any requests for shared data from the destination node 306 results in no data and/or unusable data (e.g., unreadable where the destination node 306 only has first key k1 310 and use of the third key does not return k1-encrypted data anymore at the destination node 306). If the destination node 306 has write access to the shared data, a dummy key terminates all write access in a manner which would become apparent to one having ordinary skill in the art upon reading the present disclosure.

In other approaches, the secure transcoder 320 informs the destination node 306 that the sharing has been terminated. In response to terminating the sharing, the destination node 306 deletes the stored copies of the first key k1 310 and the third key k3 328. The sharing policy may be terminated in any manner that would become apparent to one having ordinary skill in the art upon reading the present disclosure, such as by a command from the source node 302 to any of the secure transcoder 320, storage 304, the destination node 306, etc., or any combination thereof.

In exemplary implementations, the destination node 306 performs read operations by requesting data in operation 360 from the secure transcoder 320. Destination node 306 is unable to access the shared data directly from the storage 304 as it is encrypted using the second key k2 312, which is not available to the destination node 306. If the read request is allowed by the share policy, the secure transcoder 320 reads the data associated with the read request at operation 362 from the storage 304. The data associated with the read request is encoded as C2=encrypt(k2,C1) as described above. The data associated with the read request is decrypted using the secure transcoder k2 encrypt/decrypt function 330 using the second key k2 312 as C1=decrypt(k2,C2) at operation 364. The associated data (now only encrypted in first key k1 310) is encrypted at operation 366 using the secure transcoder k3 encrypt/decrypt function 332 using the third key k3 328. The associated data prior to operation 366 is still encrypted as C1=encrypt(k1,P) and the first key k1 310 is not available to the secure transcoder 320. Therefore, the secure transcoder 320 is not able to decrypt the data stored by the source node 302 on the storage 304. The secure transcoder k3 encrypt/decrypt function 332 using the third key k3 328 encrypts the associated data as C3=encrypt(k3, C1) (e.g., the data is encrypted in both the first key k1 310 and the third key k3 328). The encrypted data is sent in operation 360 to the destination node 306. The destination node 306 may decrypt the data using the destination node k3 encrypt/decrypt function 344 using the third key k3 328 as C1=decrypt(k3,C3) (e.g., the associated data is now encrypted in only the first key k1 310). The destination node 306 may decrypt the data using the destination node k1 encrypt/decrypt function 342 using the first key k1 310 as P=decrypt(k1,C1) (e.g., the destination node 306 gains access to the data in the clear).

In preferred aspects, a sharing period between the destination node 306 and the source node 302, using the secure transcoder 320, is terminated by ceasing any communication in operation 360 according to the sharing policy information described herein. In various approaches, if the communication channel between the destination node 306 and the secure transcoder 320 is left open, the sharing period between the destination node 306 and the source node 302 is terminated by the secure transcoder 320 shredding the third key k3 328 and/or the second key k2 312. In other approaches, the secure transcoder 320 may terminate the sharing period by replacing the third key k3 328 and/or the second key k2 312 with a dummy key of a type known in the art. Shredding or replacing the third key k3 328 and/or the second key k2 312 provides additional security even when the communication at operation 360 is left open in error or as a result of a design flaw, for example. A misbehaving destination node will not receive any usable data from the secure transcoder where the transcoder does not have the correct key to decrypt the encrypted data. As would become apparent to one having ordinary skill in the art upon reading the present disclosure, a secure transcoder 320 may need to renegotiate with the source node 302 and/or the destination node 306 in order to continue or resume a sharing period after shredding a key. This "key rotation" provides additional security features to the system without having to reencrypt all of the data stored in storage. For example, in conventional systems, if the transcoder were to lose a key, one approach includes reencrypting all the data in storage which may take a relatively long period of time compared to the foregoing renegotiation process.

Prior to storing the unit of data, P, the destination node 306 encrypts the data, P, using the destination node k1 encrypt/decrypt function 342 using the first key k1 310 as C1=encrypt(k1,P). Destination node 306 further encrypts the result C1 using the destination node k3 encrypt/decrypt function 344 using the third key k3 328 as C3=encrypt(k3, C1). A write request for the data (C2) is sent in operation 360 to the secure transcoder 320. If the write request is allowed by the shared policy, the secure transcoder 320 accepts the write request. The data is encoded as C3=encrypt(k3,C1) as described above. The write data is decrypted by the secure transcoder k3 encrypt/decrypt function 332 using the third key k3 328 as C1=decrypt(k3,C3). The write data is sent to the secure transcoder k2 encrypt/decrypt function 330 in operation 366. The write data at operation 366 is still encrypted as C1=encrypt(k1,P). The first key k1 310 is not available to the secure transcoder 320. Thus, the secure transcoder 320 is not able to decrypt the write data stored by the destination node 306. The secure transcoder k2 encrypt/decrypt function 330 further encrypts the write data using the second key k2 312 as C2=encrypt(k2,C1). The encrypted data (e.g., in first key k1 310 and in second key k2 312) is sent in operation 362 to the storage 304. The source node 302 may decrypt the data as C1=decrypt(k2,C2) and P=decrypt(k1,C2) using the source node k2 encrypt/decrypt function 318 and the source node k1 encrypt/decrypt function 316, respectively, using the appropriate keys as would become apparent to one having ordinary skill in the art in view of the present disclosure.

In one alternative approach, the data may be encrypted by the source node 302 in a fourth key (not shown) and the fourth key may be encrypted according to the various aspects described above. Thus, the fourth key is the data to be encrypted. In this approach, the transcoding is relatively more efficient where the keys are transcoded instead of the data. For example, a block of data may be 4 kB in length and a key may be 32 B in length. Transcoding such keys is about 128 times more efficient than transcoding the data blocks. In this approach, the data (e.g., the encrypted keys) may be sent in operation 346 to the storage 304 following the fourth key encryption, thereby bypassing the source node k1 encrypt/decrypt function 316 and the source node k2 encrypt/decrypt function 318. When transcoding, the data (e.g., the encrypted keys) may be sent in operation 368 to the destination node, thereby bypassing the secure transcoder k2 encrypt/decrypt function 330 and the secure transcoder k3 encrypt/decrypt function 332.

In other approaches, additional information may be used in the encryption which needs to be isolated from the secure transcoder 320. For example, an initialization vector (IV) may be used in encryption. An IV may refer to an arbitrary number which is used with a secret key for data encryption and only used once, as would be understood by one having ordinary skill in the art. Using the IV in the first key encryption avoids exposing the IV to the second key encryption. The IV information can be used to beneficially break translation symmetry, depending on the IV implementation, for providing additional security, as would become apparent to one having ordinary skill in the art upon reading the present disclosure. For example, in AES-XTS, the IV is an address which breaks the symmetry for the addresses. In cases where the IV is based on the data contents, the translational symmetry remains. In preferred aspects, the IV information is shared with the destination node 306, but the IV information is not shared with the secure transcoder 320. An IV may be used for the second key encryption whether or not an IV is used for the first key encryption, without weakening the security of the architecture as described herein. When the IV for the second key encryption needs to be known by the secure transcoder 320, the information for deriving the IV may be part of negotiating a secure connection between the secure transcoder 320 and the source node 302, as would become apparent to one having ordinary skill in the art upon reading the present disclosure.

In a key-per-chunk secure deduplication system, fingerprints may be computed on plaintext chunks of data and the data chunks are encrypted with a chunk specific key (e.g., each data chunk is encrypted with a unique data chunk key, such as the fourth key described above). The fingerprints are encrypted in a fifth key (e.g., a fingerprint key) to prevent the deduplicating storage system from being able to connect specific fingerprints to specific plaintext. For transcoding according to the various aspects described herein, the data chunk key may be data to be encrypted by a source node in a first key and a second key. The first key and the second key for encrypting the fingerprints may be different from the first key and the second key for encrypting the data chunk keys. The different fingerprint and chunk key data sets are securely transcoded for use at a destination node. In general, throughout the present disclosure, there may be multiple first keys and multiple second keys for transcoding data, keys, metadata, etc., that are securely shared between a source node and a destination node using a secure transcoder.

In yet another approach, for a secure deduplicating system, there is a set of second keys belonging to a keygroup where the keygroup comprises a first key, a fingerprint key, and a dedup key. In this approach, the storage system may store the deduplicated data such that the dedup key may not decrypt it. A secure transcoder, such as one configured to perform at least some of the various aspects described in detail above, may be used to transcode data from one of the second keys to the dedup key for the keygroup or from the dedup key for the keygroup to one of the second keys.

In another aspect, the keygroup may comprise a set of first keys instead of a common first key. In this approach, there is preferably a first key for each second key and for the dedup key, as would become apparent to one having ordinary skill in the art upon reading the present disclosure.

Figure 4:
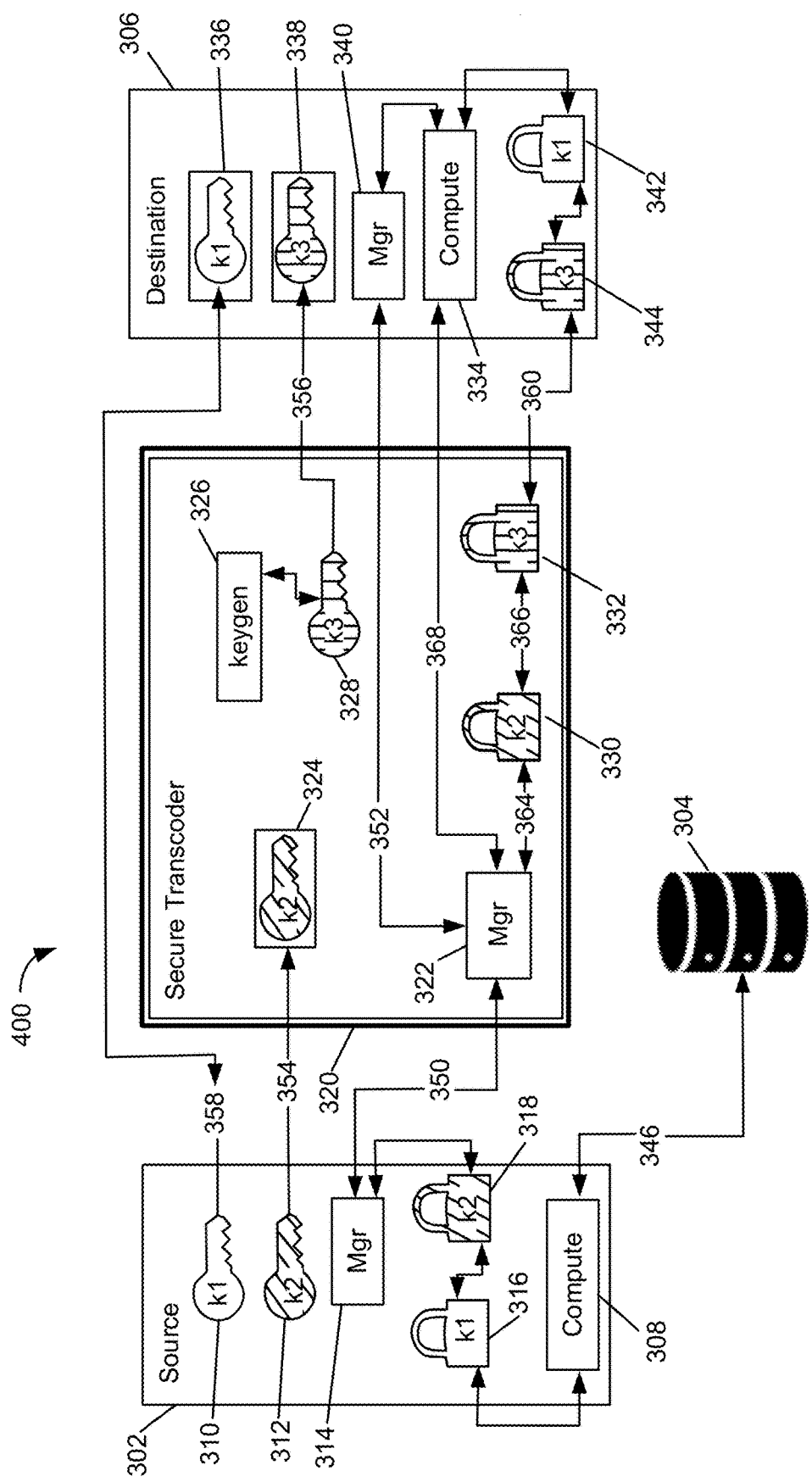
FIG. 4 is a diagram of a high level architecture, in accordance with one aspect of the present invention.

FIG. 4 depicts a high-level architecture, in accordance with various configurations. The architecture 400 may be implemented in accordance with the present invention in any of the environments depicted in FIGS. 1-3 and 5A-7, among others, in various configurations. Of course, more, or less elements than those specifically described in FIG. 4 may be included in architecture 400, as would be understood by one of skill in the art upon reading the present descriptions.

Architecture 400 is a variation of at least some of the aspects shown in FIG. 3, and therefore common features have common numbering. Architecture 400 includes a high level architecture comprising a source node 302, storage 304, and a destination node 306. The source node 302 includes a source node compute resource 308, a first key k1 310, and a second key k2 312. The source node 302 includes a source node manager function 314, a source node k1 encrypt/decrypt function 316, and a source node k2 encrypt/decrypt function 318. Any encrypt/decrypt function described herein may encrypt and/or decrypt data using the associated key as would be understood by one having ordinary skill in the art upon reading the present disclosure.

Architecture 400 includes a secure transcoder 320. The secure transcoder 320 includes a secure transcoder manager function 322 and secure key storage 324 for second key k2 312. The secure transcoder 320 may include a key generator 326, in at least some approaches. The secure transcoder 320 includes a third key k3 328. In various approaches, the key generator 326 generates the third key k3 328. In other approaches, any key as described herein may be generated and/or managed by a key generator and/or key manager known in the art (not shown). The secure transcoder 320 includes a secure transcoder k2 encrypt/decrypt function 330 and a secure transcoder k3 encrypt/decrypt function 332.

The secure transcoder 320 may be designed to perform sharing operations which are preferably each defined by separate policies. The transcoder may have a plurality of key storages and/or a plurality of secure transcoder encrypt/decrypt functions. These additional policies (and associated components) provide additional security for each share policy (e.g., each share policy may have a separate, unique third key, even the share policies may access the same data).

The destination node 306 includes a destination node compute resource 334, key storage 336 for the first key k1 310, and key storage 338 for the third key k3 328. The destination node 306 includes a destination node manager function 340. The destination node 306 includes a destination node k1 encrypt/decrypt function 342 and a destination node k3 encrypt/decrypt function 344.

Architecture 400 of FIG. 4 illustrates an exemplary implementation of a system where the data is not doubly encrypted (e.g., as shown and described in the preferred aspects of FIG. 3). Here, the source node 302 stores data on the storage 304 without encrypting the data in the first key k1 310 and without encrypting the data in the second key k2 312. The secure transcoder 320 does not talk to the storage 304. In contrast, the source node 302 reads all data from the storage 304. The source node 302 generates the first key k1 310 and the second key k2 312. The secure transcoder manager function 322 passes all read and write requests to the source node manager function 314 of the source node 302.

For a read request, the source node k1 encrypt/decrypt function 316 encrypts the data using the first key k1 310 to obtain first encrypted data. The source node k2 encrypt/decrypt function 318 encrypts the encrypted data using the second key k2 312 to obtain second encrypted data. The second encrypted data is sent in operation 350 to the secure transcoder manager function 322 and the second encrypted data is transcoded as described in detail with reference to FIG. 3. For a write request, the data is decrypted as described herein and written back to the storage 304 in the clear.

In various approaches, for customers who wish to shift to having all of the data doubly encrypted, write requests can be written doubly encrypted where metadata is stored with the block and the file system, to indicate the encryption status of the data, in any manner known in the art. All new data is doubly protected (e.g., doubly encrypted) and all "old" data, after being fully referenced, is doubly protected. In this way, a system may keep track of the state of files while having background tasks for files reaching a chosen level of protection, references the remaining data, whereby the remaining data becomes fully protected (e.g., doubly encrypted).

In another aspect, if the secure transcoder 320 has access to the storage 304 (as shown in FIG. 3), the secure transcoder 320 may be modified to look at the file metadata to determine its encryption state. If the file is protected (e.g., doubly encrypted), the secure transcoder 320 may read the file directly as before (as in FIG. 3), otherwise the secure transcoder may ask the source node manager function 314 for the data. The security associated with this aspect is less desirable than that of FIG. 3 as described above (e.g., where the secure transcoder 320 requests all data from the source node manager function 314). Allowing unencrypted data on the storage 304 is most secure when the destination node 306 does not have access to the stored data.

FIGS. 5A-5D depicts a high-level architecture, in accordance with various configurations. The architecture 500 may be implemented in accordance with the present invention in any of the environments depicted in FIGS. 1-3 and 6-7, among others, in various configurations. Of course, more, or less elements than those specifically described in FIGS. 5A-5D may be included in architecture 500, as would be understood by one of skill in the art upon reading the present descriptions.

Each architecture 500 includes a source node 302 (as described with reference to FIGS. 3-4), storage 304 (as described with reference to FIGS. 3-4), a destination node 306 (as described with reference to FIGS. 3-4), and a secure transcoder 320 (as described with reference to FIGS. 3-4). As shown, the secure transcoder 320 may be located in any location in a system. For example, as shown in FIG. 5A, the secure transcoder 320 may be part of the source node 302. This configuration may be in any of a central processing unit (CPU) complex, an IOhub, a bridge, a CPU itself, a Network Interface Card (e.g., a smartNIC), etc.

As shown in FIG. 5B, the secure transcoder 320 may be located in a storage network coupled to the source node 302, the storage 304, and the destination node 306. This configuration may be in any of a switch, an edge application, a gateway, etc.

Figure 5C:
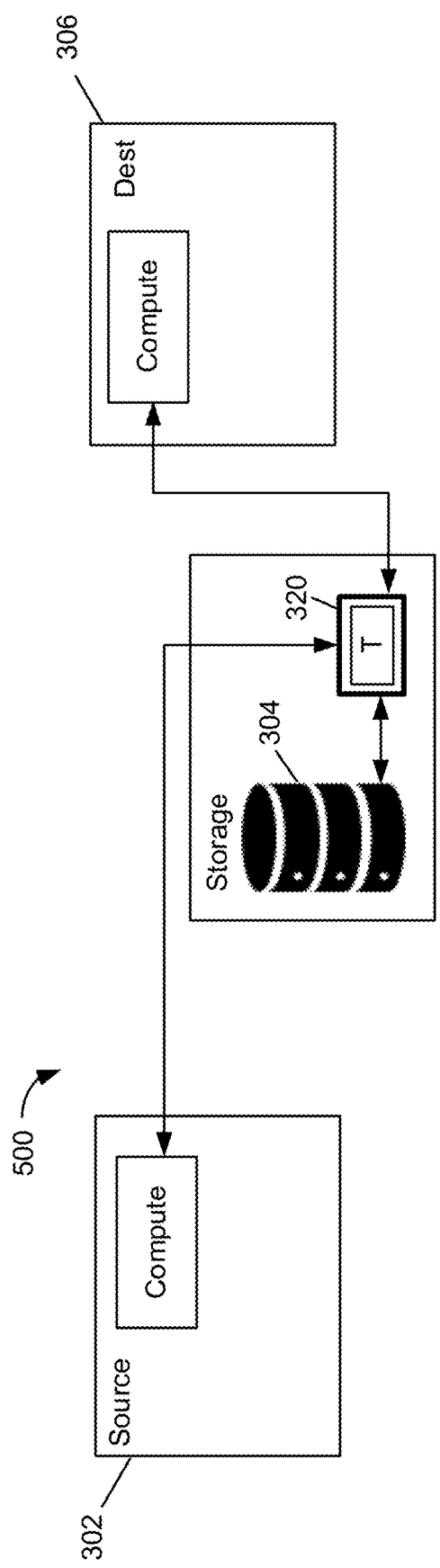

As shown in FIG. 5C, the secure transcoder 320 may be part of the storage 304. The secure transcoder 320 may be directly integrated into the storage, the storage controller, in a host bus adapter, in a smartNIC, etc.

Figure 5D:
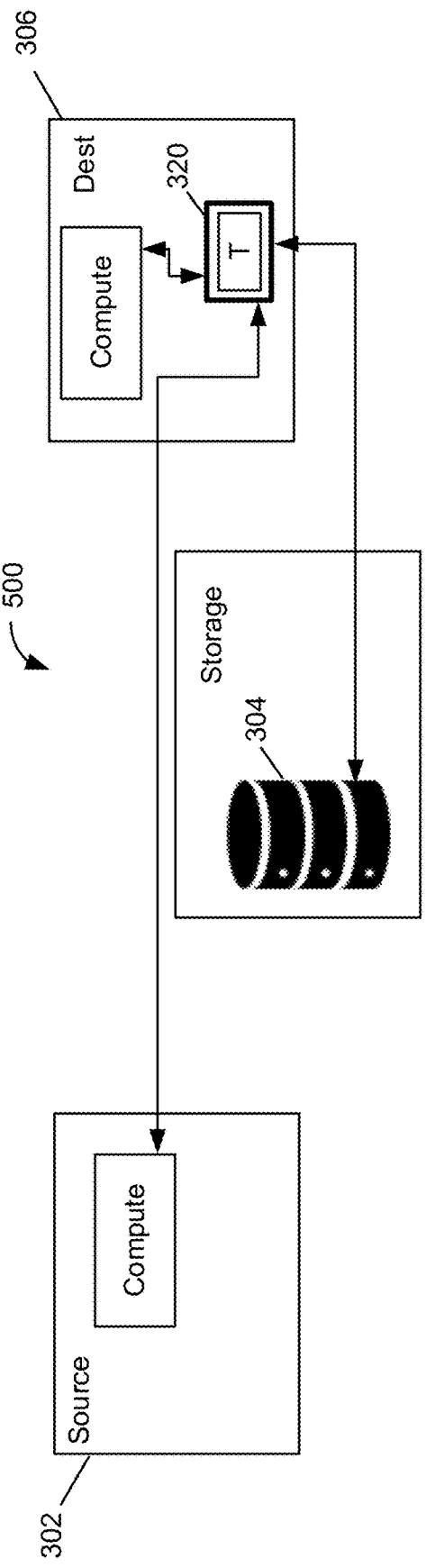

As shown in FIG. 5D, the secure transcoder 320 may be part of the destination node 306. This configuration may be in any of a CPU complex, an IOhub, a bridge, a CPU itself, a smartNIC, etc.

In various approaches, it would be beneficial to have a secure transcoder at each of multiple locations (e.g., all four locations shown including FIGS. 5A-5D) to allow sharing to be set up using the best transcode location for the particular operation. For example, transcoding at the source node is beneficial for storage directly attached to the source. In another example, transcoding at the storage is beneficial for scaling and network utilization as would be understood by one having ordinary skill in the art. In some instances, a destination node for a first share may be the source node for a second share and it would be advantageous to have the transcode function at each source node and each destination node. From a security perspective, it may not be preferred to use a transcode function as described herein at a destination node (even if there is a transcode function at the destination) as the transcoding location for the sharing shown in FIG. 3. This may result in the first key and the second key both being at the destination node. For the strongest security, when all nodes (e.g., the source nodes, the storage, and the destination nodes) each have a transcoding function, the protocols for accessing data do not utilize the transcoder in the destination node(s), in preferred aspects, as would become apparent to one having ordinary skill in the art upon reading the present disclosure.

For strong security, it is beneficial to treat the first key and the second key as a pair for data isolation. For example, the set of information encrypted in the first key should be the same set of information that is encrypted in the second key. If multiple second keys use a common first key, there may be situations where data could be moved across key boundaries in ways which expose the data to data leakage.

In preferred aspects, every arrow shown in FIGS. 3-5D and any communication between the components described herein may include additional protocols for communication encryption known in the art. For example, a communication encryption protocol Secure Sockets Layer (SSL), Transport Layer Security (TSL), etc., protocols may be used to transfer the keys between the source node and the destination node, between the source node and the secure transcoder, and between the secure transcoder and the destination node, etc., as would become apparent to one having ordinary skill in the art upon reading the present disclosure.

Figure 6:
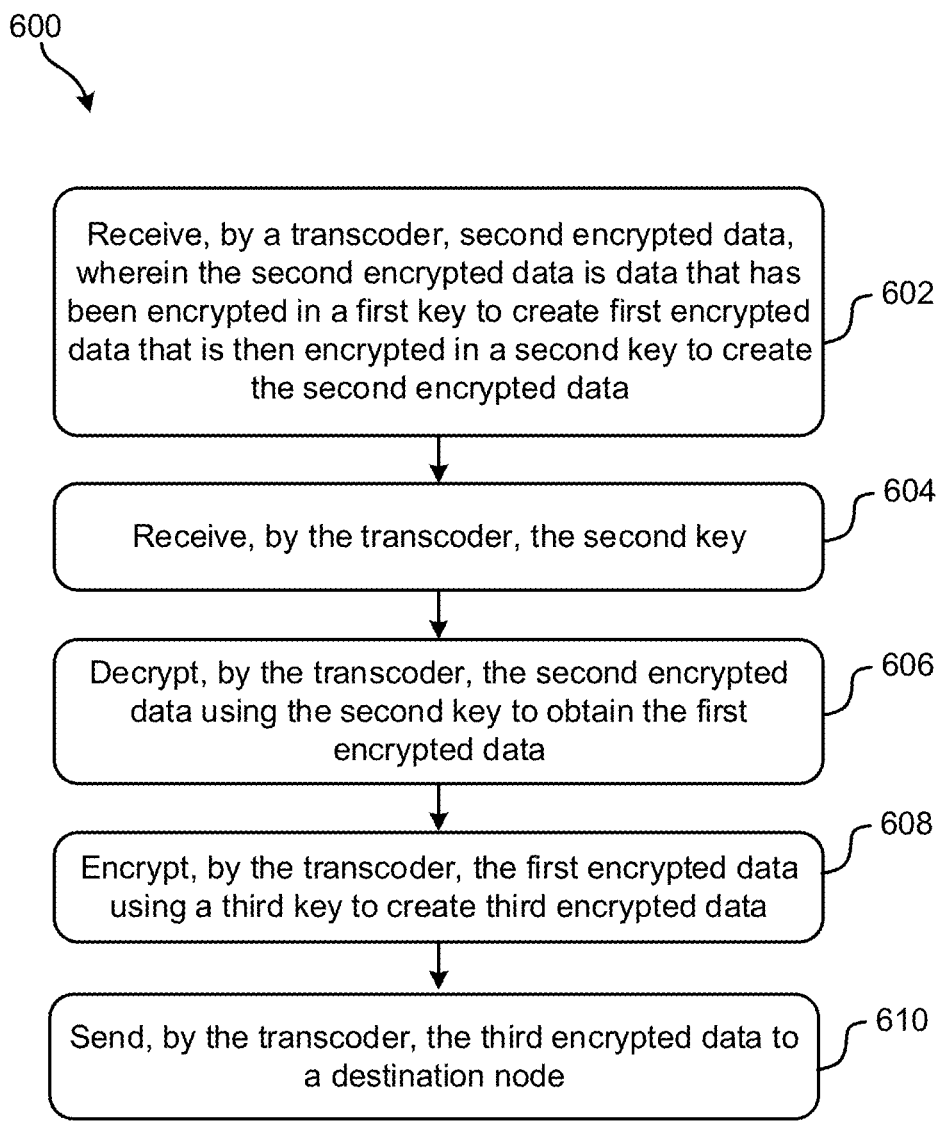
FIG. 6 is a flowchart of a method, in accordance with one aspect of the present invention.

Now referring to FIG. 6, a flowchart of a method 600 is shown according to one aspect. The method 600 may be performed in accordance with the present invention in any of the environments depicted in FIGS. 1-5D and 7, among others, in various aspects. Of course, more, or fewer operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes receiving, by a transcoder, second encrypted data. The second encrypted data is data that has been encrypted in a first key to create first encrypted data that is then encrypted in a second key to create the second encrypted data. In preferred aspects, the encryption of data into first encrypted data and then the encryption of first encrypted data into the second encrypted data occurs at a source node. The source node comprises the first key and the second key.

In one approach, the second encrypted data is received based at least in part on data requests from the transcoder to storage. In response to receiving a request for the data from a destination node, the transcoder may send a data request directly to the storage. The storage may send the second encrypted data directly to the transcoder in response to the data request, in one approach. For example, the data may be encrypted in a first key to create first encrypted data that is then encrypted in a second key to create the second encrypted data at a source node prior to the source node storing the second encrypted data in the storage. The storage may send the second encrypted data to the transcoder in response to a data request from the transcoder.

In another approach, the second encrypted data is received based at least in part on data requests from the transcoder to the source node. In response to receiving a request for the data from a destination node, the transcoder may send a data request to the source node. The source node may store the second encrypted data in storage and the source node may send the second encrypted data (previously stored in the storage) to the transcoder.

In yet another approach, the source node may store the data unencrypted in the storage. In response to receiving a request from the transcoder for the data, the source node may pull the unencrypted data from the storage and then encrypt the unencrypted data with the first key to create first encrypted data and then encrypt the first encrypted data with the second key to create the second encrypted data which is sent to the transcoder in response to a data request from the transcoder to the source node.

In various aspects, the second encrypted data is received at the transcoder from storage, from a source node, etc., based on data requests from at least one destination node. There may be any number of destination nodes which request data from a source node via the transcoder. In some approaches, the transcoder may receive the second encrypted data in response to data requests from the destination node according to sharing policy information between the source node, the destination node, the storage, the transcoder, etc. The sharing policy information may include what data may be shared between which entities, a time length for a sharing period between any entities, a number of operations associated with a sharing period between any entities, an amount of data which may be shared per sharing period between any entities, etc. In various approaches, the sharing policy information determines when to terminate the sharing period. The sharing period may be terminated according to the policy, in response to shredding at least one key, in response to a request to end the sharing period by the source node, a power off event, any other trigger event, etc., or a combination thereof, in various aspects.

In at least some approaches, a source node stores data on the storage. The data may be unencrypted data, the second encrypted data, another key-encrypted data (e.g., data which is encrypted in a key other than the first key or second key, prior to encryption by the first key and then the second key), etc. In preferred aspects, the source node comprises the first key and the second key. The associated encryption of the data to create the first encrypted data and then the encryption of the first encrypted data to create the second encrypted data may be performed by at least one encrypt/decrypt function on the source node, in some approaches. In other approaches, each key may be associated with a separate encrypt/decrypt function located on the source node, as would be understood by one having ordinary skill in the art in view of the present disclosure.

Operation 604 includes receiving, by the transcoder, the second key. In various approaches, the second key is received from the source node. In various approaches, the source node sends the transcoder a copy of the second key which the transcoder securely stores for an amount of time, a number of operations, etc., as defined by the sharing policy information. In at least some aspects, in response to an end of the sharing period (e.g., as determined by the sharing policy, as requested by the source node, etc.), the transcoder may shred the second key and/or replaces the second key with a dummy key, in a manner that would become apparent to one having ordinary skill in the art upon reading the present disclosure. The dummy key may be of any type known in the art.

In other approaches, the second key may be received from a key manager. A key manager may be coupled to the source node, the destination node, and/or any other component in the network, for providing, generating, managing, etc., keys for sharing data between the source node and the destination node.

Operation 606 includes decrypting, by the transcoder, the second encrypted data using the second key to obtain the first encrypted data. The second encrypted data, as described above, is data which was encrypted in the first key to create the first encrypted data and then encrypted in the second key to create the second encrypted data. According to operation 606, the transcoder may use an encrypt/decrypt function and the second key (sent by the source node, in some approaches) at the transcoder to obtain the first encrypted data. The transcoder preferably never obtains the data in the clear (or the original data in another key-encrypted form) where the transcoder does not have access to the first key (e.g., to decrypt the first encrypted data to obtain the data).

Operation 608 includes encrypting, by the transcoder, the first encrypted data using a third key to create third encrypted data. The first encrypted data (e.g., encrypted only in the first key) may be encrypted with a new, third key to create the third encrypted data by an encrypt/decrypt function on the transcoder. The encrypt/decrypt function may be the same as or different from (e.g., separate from, only for use with the third key, etc.) the encrypt/decrypt function of operation 606. In at least some approaches, the third key may be generated by the transcoder by a key generator on the transcoder. In other approaches, any key may be generated and/or managed by a key manager and/or key generator coupled to the source node, the transcoder, the destination node, etc.

In various approaches, method 600 includes sending, by the transcoder, the third key to a destination node. In preferred approaches, the destination node which receives the third key is the destination node from which the request for the data originated. In various approaches, the transcoder sends the destination node a copy of the third key which the destination node securely stores for an amount of time, a number of operations, etc., as defined by the sharing policy information, and/or in any manner that would become apparent to one having ordinary skill in the art upon reading the present disclosure. In preferred aspects, in response to an end of the sharing period (e.g., as determined by the sharing policy, as requested by the source node, etc.), the transcoder shreds the third key and/or replaces the third key with a dummy key for ending data sharing between the source node and the destination node, in any manner that would become apparent to one having ordinary skill in the art upon reading the present disclosure. The dummy key may be of any type known in the art.

In other approaches, the third key may be sent to the destination node from a key manager. A key manager may be coupled to the source node, the destination node, and/or any other component in the network, for providing, generating, managing, etc., keys for sharing data between the source node and the destination node.

Operation 610 includes sending, by the transcoder, the third encrypted data to the destination node. The third encrypted data, as described above, is the first encrypted data (e.g., data encrypted in the first key) encrypted using the third key to create the third encrypted data. The destination node received the first key directly from the source node in various approaches. The destination node is configured to decrypt the third encrypted data using the third key to obtain the first encrypted data using an encrypt/decrypt function on the destination node, in various approaches. The destination node is configured to decrypt the first encrypted data using the first key to obtain the data using an encrypt/decrypt function on the destination node (which may be the same or different from the encrypt/decrypt function for decrypting the third encrypted data to obtain the first encrypted data). The data, as discussed above may be data in the clear, unencrypted data, plaintext data, data in another key-encrypted form, etc.

In one aspect, the data (e.g., the unencrypted data) includes a plurality of data chunks where each data chunk is encrypted in a fourth key. The fourth key may be encrypted in the first key to create a first encrypted fourth key which is then encrypted in the second key to create a second encrypted fourth key. In at least some approaches, each data chunk may be associated with a different fourth key as would become apparent to one having ordinary skill in the art upon reading the present disclosure. In the foregoing aspect, the transcoder may receive the second encrypted fourth key and the second key in a manner similar to that described in operation 602 and 604, respectively. The transcoder may decrypt the second encrypted fourth key using the second key to obtain the first encrypted fourth key (e.g., now only encrypted with the first key), in a similar manner as described in operation 606. The transcoder may encrypt the first encrypted fourth key using the third key to create a third encrypted fourth key, in a similar manner as described in operation 608. The transcoder may send the third key and the third encrypted fourth key (e.g., the fourth key encrypted in the first key to obtain the first encrypted fourth key and then the first encrypted fourth key is encrypted in the third key to obtain the third encrypted fourth key) to the destination node (e.g., as in operation 610 and described in method 600) and the destination node may be configured to decrypt the third encrypted fingerprints using the third key (received from the transcoder or a key manager, in various approaches) to obtain the first encrypted fourth key. The destination node may then decrypt the first encrypted fourth key using the first key which the destination node receives from the source node or a key manager, in various approaches, to obtain the fourth key. The fourth key may be used to decrypt the data chunks which are sent to the destination node encrypted in the fourth key. Transcoding the key(s), rather than the data, may be more efficient where the keys are relatively shorter in length than the data blocks requested by the destination node.

According to some approaches, the data (e.g., the unencrypted data) includes a plurality of data chunks where each data chunk has a fingerprint associated therewith and/or computed thereof. Each fingerprint may be computed using SHA-256 or any other secure hash algorithm known in the art. The fingerprints may be doubly encrypted according to at least some of the aspects described herein. Encrypted fingerprints may be used in key-per-chunk secure deduplication such that the fingerprint data may be securely transcoded for use at the destination node. The encrypted fingerprints may be used for determining dedup opportunities, as an end-to-end integrity check, for providing additional data privacy, etc. There may be any number of keys for transcoding data, fingerprints, metadata, etc., for secure sharing according to at least some of the operations described herein. In preferred approaches of the foregoing aspect, each data chunk is associated with (e.g., encrypted/decrypted by) at least one unique key compared to any other data chunk. In various approaches, each data chunk of the data and/or each fingerprint may be associated with its own first key, second key, or first and second key. In this way, at least some aspects of the present disclosure provide forward secrecy by changing at least one key for each data chunk going to the destination node. The destination node has that data chunk in the clear (after transcoding the data chunk, if applicable), but the source node is able to define how much data the destination node receives by changing the key for each data chunk.

Figure 7:
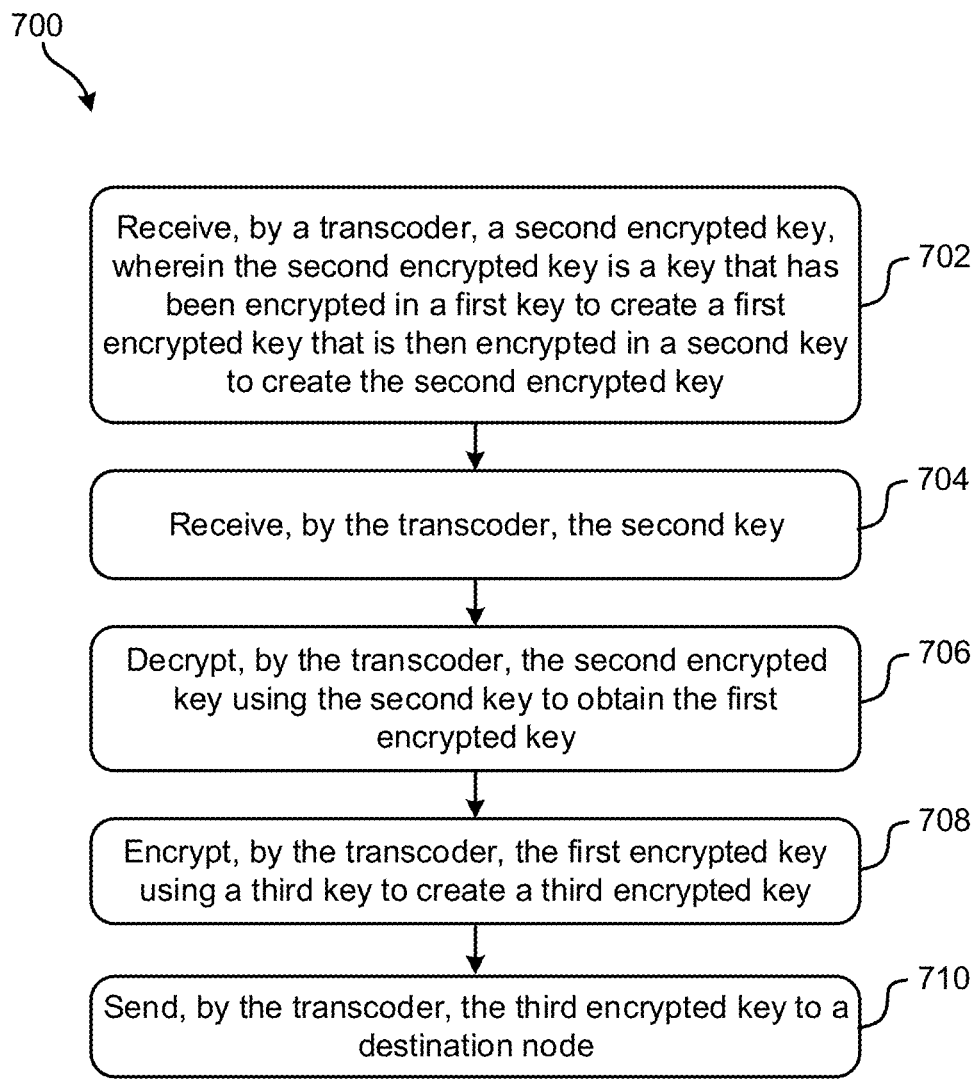
FIG. 7 is a flowchart of a method, in accordance with one aspect of the present invention.

Now referring to FIG. 7, a flowchart of a method 700 is shown according to one aspect. The method 700 may be performed in accordance with the present invention in any of the environments depicted in FIGS. 1-6 and 7, among others, in various aspects. Of course, more, or fewer operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes receiving, by a transcoder, a second encrypted key. The second encrypted key is a key that has been encrypted in a first key to create a first encrypted key that is then encrypted in a second key to create the second encrypted key. In preferred aspects, the encryption of the key into the first encrypted key and then the encryption of the first encrypted key into the second encrypted key occurs at a source node. The source node comprises the first key and the second key.

Operation 704 includes receiving, by the transcoder, the second key. In various approaches, the second key is received from the source node. In various approaches, the source node sends the transcoder a copy of the second key which the transcoder securely stores for an amount of time, a number of operations, etc., as defined by the sharing policy information. In at least some aspects, in response to an end of the sharing period (e.g., as determined by the sharing policy, as requested by the source node, etc.), the transcoder may shred the second key and/or replaces the second key with a dummy key, as would become apparent to one having ordinary skill in the art upon reading the present disclosure. The dummy key may be of any type known in the art.

In other approaches, the second key may be received from a key manager. A key manager may be coupled to the source node, the destination node, and/or any other component in the network, for providing, generating, managing, etc., keys for sharing data between the source node and the destination node.

Operation 706 includes decrypting, by the transcoder, the second encrypted key using the second key to obtain the first encrypted key. The second encrypted key, as described above, is a key which was encrypted in the first key to create the first encrypted key and then encrypted in the second key to create the second encrypted key. According to operation 706, the transcoder may use an encrypt/decrypt function and the second key (sent by the source node, in some approaches) at the transcoder to obtain the first encrypted key. The transcoder preferably never obtains the key in the clear where the transcoder does not have access to the first key (e.g., to decrypt the first encrypted key to obtain the key).

Operation 708 includes encrypting, by the transcoder, the first encrypted key using a third key to create a third encrypted key. The first encrypted key (e.g., encrypted only in the first key) may be encrypted with a new, third key to create the third encrypted key by an encrypt/decrypt function on the transcoder. The encrypt/decrypt function may be the same as or different from (e.g., separate from, only for use with the third key, etc.) the encrypt/decrypt function of operation 706. In at least some approaches, the third key may be generated by the transcoder by a key generator on the transcoder. In other approaches, any key may be generated and/or managed by a key manager and/or key generator coupled to the source node, the transcoder, the destination node, etc.

In at least some approaches, method 700 includes sending, by the transcoder, the third key to a destination node. In various approaches, the transcoder sends the destination node a copy of the third key which the destination node securely stores for an amount of time, a number of operations, etc., as defined by a sharing policy information. In preferred aspects, in response to an end of a sharing period (e.g., as determined by the sharing policy, as requested by the source node, etc.), the transcoder shreds the third key and/or replaces the third key with a dummy key for ending data sharing between the source node and the destination node, in any manner that would become apparent to one having ordinary skill in the art upon reading the present disclosure. The dummy key may be of any type known in the art.

In other approaches, the third key may be sent to the destination node from a key manager. A key manager may be coupled to the source node, the destination node, and/or any other component in the network, for providing, generating, managing, etc., keys for sharing data between the source node and the destination node.

Operation 710 includes sending, by the transcoder, the third encrypted key to the destination node. The third encrypted key, as described above, is the first encrypted key (e.g., a key encrypted in the first key) encrypted using the third key to create the third encrypted key. The destination node received the first key directly from the source node in various approaches. The destination node is configured to decrypt the third encrypted key using the third key to obtain the first encrypted key using an encrypt/decrypt function on the destination node, in various approaches. The destination node is configured to decrypt the first encrypted key using the first key to obtain the key using an encrypt/decrypt function on the destination node (which may be the same or different from the encrypt/decrypt function for decrypting the third encrypted key to obtain the first encrypted key). The key, as discussed above may be a key in the clear, an unencrypted key, etc.

In various approaches, the destination node may use the key (e.g., the unencrypted key) to decrypt data from the source node. For example, this unencrypted key may be the first key in at least some of the operations described in method 600 of FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a transcoder, second encrypted data,
      wherein the second encrypted data is data that has been encrypted in a first key to create first encrypted data that is then encrypted in a second key to create the second encrypted data;
   receiving, by the transcoder, the second key;
   decrypting, by the transcoder, the second encrypted data using the second key to obtain the first encrypted data;
   encrypting, by the transcoder, the first encrypted data using a third key to create third encrypted data;
   sending, by the transcoder, the third encrypted data to a destination node; and
   sending, by the transcoder, the third key to the destination node, wherein the destination node is configured to decrypt the third encrypted data using the third key to obtain the first encrypted data, wherein the destination node is configured to decrypt the first encrypted data using the first key to obtain the data.

2. The computer-implemented method of claim 1, wherein the second key is received from a source node that sent the second encrypted data to the transcoder.

3. The computer-implemented method of claim 1, wherein the second encrypted data is received based at least in part on data requests from the transcoder to storage.

4. The computer-implemented method of claim 1, wherein the third key is independently generated by the transcoder.

5. The computer-implemented method of claim 1, wherein the data includes a plurality of data chunks, wherein each data chunk is encrypted in a fourth key, wherein the fourth key is encrypted in the first key to create a first encrypted fourth key which is then encrypted in the second key to create a second encrypted fourth key;
   receiving, by the transcoder, the second encrypted fourth key;
   decrypting, by the transcoder, the second encrypted fourth key using the second key to obtain the first encrypted fourth key;
   encrypting, by the transcoder, the first encrypted fourth key using the third key to create a third encrypted fourth key; and
   sending, by the transcoder, the third encrypted fourth key to the destination node.

6. The computer-implemented method of claim 2, wherein the transcoder is located on the source node.

7. The computer-implemented method of claim 3, wherein the transcoder is located on the storage.

8. The computer-implemented method of claim 3, wherein the transcoder is located on a storage network coupled to a source node and the storage; and comprising replacing, by the transcoder, the third key with a dummy key for ending data sharing between the source node and the destination node.

9. The computer-implemented method of claim 1, comprising:
   replacing, by the transcoder, the third key with a dummy key for ending data sharing between a source node and the destination node.

10. A computer-implemented method, comprising:
    receiving, by a transcoder, a second encrypted key,
       wherein the second encrypted key is a key that has been encrypted in a first key to create a first encrypted key that is then encrypted in a second key to create the second encrypted key,
    receiving, by the transcoder, the second key,
    decrypting, by the transcoder, the second encrypted key using the second key to obtain the first encrypted key,
    independently generating, by the transcoder, a third key;
    encrypting, by the transcoder, the first encrypted key using the third key to create a third encrypted key; and
    sending, by the transcoder, the third encrypted key to a destination node,
       wherein the destination node is configured to decrypt the third encrypted key using the third key to obtain the first encrypted key, wherein the destination node is configured to decrypt the first encrypted key using the first key to obtain the key.

11. The computer-implemented method of claim 10, wherein the destination node uses the key to decrypt data from a source node.

12. A system, comprising:
    a hardware processor; and
    logic integrated with the processor, executable by the processor, or integrated with and executable by the processor, the logic being configured to:
    receive, by a transcoder, second encrypted data,
       wherein the second encrypted data is data that has been encrypted in a first key to create first encrypted data that is then encrypted in a second key to create the second encrypted data;
    receive, by the transcoder, the second key;
    decrypt, by the transcoder, the second encrypted data using the second key to obtain the first encrypted data;
    encrypt, by the transcoder, the first encrypted data using a third key to create third encrypted data;
    send, by the transcoder, the third encrypted data to a destination node; and
    send, by the transcoder, the third key to the destination node, wherein the destination node is configured to decrypt the third encrypted data using the third key to obtain the first encrypted data, wherein the destination node is configured to decrypt the first encrypted data using the first key to obtain the data.

13. The system of claim 12, wherein the second key is received from a source node that created the second encrypted data.

14. The system of claim 12, wherein the second encrypted data is received based at least in part on data requests from the transcoder to storage.

15. The system of claim 13, wherein the second encrypted data is received based at least in part on data requests from the transcoder to the source node.

16. The system of claim 12, wherein the data includes a plurality of data chunks, wherein each data chunk is encrypted in a fourth key, wherein the fourth key is encrypted in the first key to create a first encrypted fourth key which is then encrypted in the second key to create a second encrypted fourth key; and logic configured to:
receive, by the transcoder, the second encrypted fourth key;
decrypt, by the transcoder, the second encrypted fourth key using the second key to obtain the first encrypted fourth key;
encrypt, by the transcoder, the first encrypted fourth key using the third key to create a third encrypted fourth key; and
send, by the transcoder, the third encrypted fourth key to the destination node.

17. The system of claim 13, wherein the transcoder is located on the source node.

18. The system of claim 14, wherein the transcoder is located on the storage.

19. The system of claim 14, wherein the third key is independently generated by the transcoder.

20. The system of claim 12, comprising logic configured to:
replace, by the transcoder, the third key with a dummy key for ending data sharing between a source node and the destination node.

21. A computer program product, the computer program product comprising:
one or more computer readable storage media, and program instructions collectively stored on the one or more computer readable storage media, the program instructions comprising:
program instructions to receive, by a transcoder, second encrypted data, wherein the second encrypted data is data that has been encrypted in a first key to create first encrypted data that is then encrypted in a second key to create the second encrypted data;
program instructions to receive, by the transcoder, the second key;
program instructions to decrypt, by the transcoder, the second encrypted data using the second key to obtain the first encrypted data;
program instructions to encrypt, by the transcoder, the first encrypted data using a third key to create third encrypted data;
program instructions to send, by the transcoder, the third encrypted data to a destination node; and
program instructions to send, by the transcoder, the third key to the destination node, wherein the destination node is configured to decrypt the third encrypted data using the third key to obtain the first encrypted data, wherein the destination node is configured to decrypt the first encrypted data using the first key to obtain the data.

22. A computer program product, the computer program product comprising:
one or more computer readable storage media, and program instructions collectively stored on the one or more computer readable storage media, the program instructions comprising:
program instructions to receive, by a transcoder, a second encrypted key, wherein the second encrypted key is a key that has been encrypted in a first key to create a first encrypted key that is then encrypted in a second key to create the second encrypted key,
program instructions to receive, by the transcoder, the second key,
program instructions to decrypt, by the transcoder, the second encrypted key using the second key to obtain the first encrypted key,
program instructions to encrypt, by the transcoder, the first encrypted key using a third key to create a third encrypted key;
program instructions to send, by the transcoder, the third encrypted key to a destination node; and
program instructions to send, by the transcoder, the third key to the destination node, wherein the destination node is configured to decrypt the third encrypted key using the third key to obtain the first encrypted key, wherein the destination node is configured to decrypt the first encrypted key using the first key to obtain the key.

* * * * *